(12) United States Patent
Göransson et al.

(10) Patent No.: US 8,565,151 B2
(45) Date of Patent: Oct. 22, 2013

(54) METHOD AND ARRANGEMENT RELATING TO COMMUNICATIONS NETWORK

(75) Inventors: Bo Göransson, Sollentuna (SE); Christer Edholm, Täby (SE); Stephen Grant, Pleasanton, CA (US); Erik Larsson, Uppsala (SE); Frederik Ovesjö, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 605 days.

(21) Appl. No.: 12/738,216

(22) PCT Filed: Oct. 31, 2007

(86) PCT No.: PCT/SE2007/050801
§ 371 (c)(1),
(2), (4) Date: Apr. 15, 2010

(87) PCT Pub. No.: WO2009/058059
PCT Pub. Date: May 7, 2009

(65) Prior Publication Data
US 2010/0220657 A1    Sep. 2, 2010

(51) Int. Cl.
*H04W 40/00* (2009.01)
(52) U.S. Cl.
USPC .......................................... 370/328
(58) Field of Classification Search
USPC ......... 370/335, 338–329, 312, 328, 252, 347, 370/341–344, 432, 479, 498; 375/148; 714/749
See application file for complete search history.

(56) References Cited

U.S. PATENT DOCUMENTS

| | | | |
|---|---|---|---|
| 8,000,310 B2* | 8/2011 | Frederiksen et al. | 370/342 |
| 2004/0093545 A1 | 5/2004 | Khandani et al. | |
| 2005/0195889 A1* | 9/2005 | Grant et al. | 375/148 |
| 2005/0243793 A1* | 11/2005 | Kim et al. | 370/347 |
| 2006/0291403 A1* | 12/2006 | Kahtava et al. | 370/252 |
| 2007/0133449 A1* | 6/2007 | Schacht et al. | 370/312 |
| 2007/0177555 A1* | 8/2007 | Brueck et al. | 370/338 |
| 2008/0232313 A1* | 9/2008 | Kuo | 370/329 |
| 2009/0034461 A1* | 2/2009 | Pelletier et al. | 370/329 |
| 2009/0059849 A1 | 3/2009 | Namba et al. | |
| 2009/0213829 A1* | 8/2009 | Malkamaki et al. | 370/342 |
| 2009/0300456 A1* | 12/2009 | Pelletier et al. | 714/749 |

(Continued)

FOREIGN PATENT DOCUMENTS

| | | |
|---|---|---|
| WO | 2007022126 A3 | 2/2007 |
| WO | 2007027526 A2 | 3/2007 |
| WO | 2007105685 A1 | 9/2007 |

OTHER PUBLICATIONS

Japanese Office Action in corresponding Japanese Application No. 2010-530955 mailed Oct. 26, 2011.

(Continued)

*Primary Examiner* — Kwang B Yao
*Assistant Examiner* — Syed M Bokhari
(74) *Attorney, Agent, or Firm* — Potomac Patent Group PLLC

(57) ABSTRACT

The present invention relates to a method and arrangements in a communications system enabled for transmission of several data streams to or from different receivers (120a-120c, 400) using a shared physical channel. The method comprises the step of masking control channel with different sequences corresponding to a receiver identity with respect to the number of simultaneously scheduled receivers.

10 Claims, 3 Drawing Sheets

(56) References Cited

U.S. PATENT DOCUMENTS

2010/0202414 A1* 8/2010 Malladi et al. ............... 370/335
2012/0082054 A1* 4/2012 Gholmieh et al. ............ 370/252
2012/0147816 A1* 6/2012 Gholmieh et al. ............ 370/328

OTHER PUBLICATIONS

3rd Generation Partnership Project, Technical Specification Group Radio Access Network; Universal Mobile Telecommunications System (UMTS); Multiplexing and channel coding (FDD), 3GPP TS 25.212 version 7.6.0 Release 7 (2007) pp. 1-103.

International Search Report issued in International Application No. PCT/SE2007/050801 on Oct. 20, 2008.

Japanese Office Action in corresponding Japanese Application No. 2010-530955 dated Jul. 27, 2012.

International Preliminary Report on Patentability for PCT/SE2007/050801 dated May 4, 2010.

* cited by examiner

METHOD AND ARRANGEMENT RELATING TO COMMUNICATIONS NETWORK

TECHNICAL FIELD

The present invention relates to a method and arrangement in a communications system, especially a system enabled for transmission of several data streams to or from different receivers using physical channels and a shared control channel, e.g. in Multi User MIMO.

BACKGROUND OF THE INVENTION

Multiple-input multiple-output (MIMO) is a promising technology for future wireless communication systems. By exploiting the multi-dimensional wireless channel created by multiple transmit and receive antennas, MIMO systems significantly increase the channel capacity and link robustness of wireless communication, and have been widely adopted in many future wireless communication standards (e.g., WiMAX, 3GPP LTE, etc).

FIG. 1 illustrates a multi-user MIMO system 100 comprising a base station 110, its antennas 115, and a number of user equipments (UEs) 120a-120c each being equipped with multiple antennas 125.

In a Multi-User MIMO (MU-MIMO) system, the single base station 110 transmits to multiple UEs 120a-120c simultaneously over the same frequency band, thereby substantially increasing the sum data-rate and reducing the latency of mobile users compared to other multi-access (MAC) schemes such as conventional TDMA or FDMA. The gains achievable by the introduction of MU-MIMO in wireless systems are forecast to play a major role in the increase of spectral efficiency of future wireless networks.

MU-MIMO is one way to improve the capacity of a wireless communication system. In contrast to Single-User MIMO (SU-MIMO) where several modulated data streams are sent to/from one user, MU-MIMO works by transmitting (or receiving) one (or more) data stream(s) to several users. All data streams use the same physical resource (time, frequency or code resource, etc.).

The current version of the WCDMA specification, e.g. Rel. 7, supports MIMO operation with dual stream transmission. Hence, two modulated data streams can be transmitted in parallel to a user, thus providing a peak data rate of 28 Mbps. This is accomplished by re-using the high-speed physical downlink shared channel (HS-PDSCH) spreading codes for each transmitted data stream.

It is also possible to schedule two users in the same TTI (Transmission Time Interval) using the same set of spreading codes. Hence, MU-MIMO operation is supported. In this case, only one stream (or transport block) can be scheduled to each user.

This can be done by addressing each user with its own control channel and thereby one High Speed Shared Control CHannel (HS-SCCH) is transmitted to each user.

Since the spreading codes are reused between the transmitted data streams, a code reuse (CR) interference term will exist in every TTI where dual stream transmission is performed. This is regardless of SU- or MU-MIMO operation. In case of SU-MIMO operation, this will be known in the terminal since this information is conveyed in the control channel information.

If the two transmitted data streams are meant for two different users, i.e. MU-MIMO operation is used, this information is not known to the UE, since each of the shared control channels indicates that only a single stream is scheduled to each user.

To some extent, this can be compensated for by the scheduler. When scheduling two users in parallel, the data rate to each user can be decreased to retain a decent probability of correct detection. The problem is that the scheduler does not know how large a back-off is needed for each user.

Alternatively, a user has to read all control channels, i.e. also those meant for other users, and from that information deduce if another data stream is scheduled or not. This will, of course, increase the burden on the UE and contribute to a more complex system.

Furthermore, other users' control channels may not always be reliably decoded since the users' control channels are power controlled separately for each user.

SUMMARY OF THE INVENTION

An advantage of the present invention is that the UE can identify if another data stream is present for another simultaneously scheduled user. This simultaneously scheduled data stream will give rise to inter-stream interference which can then be suppressed or removed by appropriate receiver processing. This will result in a higher system throughput, since the network does not need to be conservative when estimating a transport format.

The advantages are achieved using a method where several data streams are transmitted to or from different receivers using a shared physical channel. The method comprises masking a shared control channel with different sequences corresponding to a receiver identity with respect to the number of simultaneously scheduled receivers. According to one embodiment the coding of control data is by means of a sequence uniquely identifying each receiver. The invention, according to one embodiment also allows allocating at least two sequences such that a first sequence can be used when the data stream is sent to a single receiver and a second sequence is used to code the control data when another stream is scheduled for a second receiver. Preferably, each receiver is associated with at least two HS-DSCH Radio Network Transaction Identifiers (H-RNTIs). However, it is also possible to derive different receiver masking sequences from one HS-DSCH Radio Network Transaction Identifiers (H-RNTI). In one embodiment a control channel data structure is modified, which comprises a first and a second part and that coding in the first part depends on transmission to single or multiple receivers and the second part may be modified by a CRC masking depending on the transmission to a single receiver or multiple receivers.

The invention also relates to a data structure for use in a communications system enabled for transmission of several data streams to or from different receivers using a shared channel. The data structure comprises a first and a second part and the first part comprises coded data depending on transmission to a single receiver or multiple receivers. In the data structure according to another embodiment, the second part comprises a CRC masking depending on transmission to a single receiver or multiple receivers.

The invention also relates to a coding arrangement in an infrastructure node of a communications network enabled for transmission of several data streams to or from different receivers using a shared physical channel. The arrangement comprises a logic block for Redundancy and Constellation Version coding (RV coding) in communication with a logic block for receiver specific CRC attachment, which communicates with a logic block for a second channel coding, the output of which is input to a second rate matching logical block connected to a channel mapping arrangement connected to a receiver specific masking logic in communication with a first rate matching logical block connected to first channel coding block. The coding arrangement further comprises a logical unit configured to associate a user equipment, UE, with at least two HS-DSCH Radio Network Transaction Identifiers (H-RNTIs) based on the number of parallel transmission streams. In one embodiment, different UE masking sequences are derived from one H-RNTI. The arrangement may further comprise means for detecting if a single MIMO user is scheduled one stream, and means to generate one specific masking, and if a second stream is scheduled to another UE, means to apply a second UE masking.

The invention also relates to a base station in a MIMO operated network, comprising the aforementioned coding arrangement.

The invention also relates to a user device comprising a processing unit configured to execute instruction sets for operating the user device, a memory unit, a user interface unit, and a communication interface for communicating with a communications network. The processing unit is configured to detect internal handle of code-reuse interference in a data stream received by the communication interface. The processor is further configured to analyse a masking in a part of the stream, and calculate a correct user device weight and decide how to handle control data. The stream may comprise a masked control channel, masked with different sequences corresponding to an identity of the user device corresponding to the number of simultaneously scheduled user devices. Most preferably, the identity is HS-DSCH Radio Network Transaction Identifier (H-RNTI). However, the masking may be derived from different user device masking sequences from one HS-DSCH Radio Network Transaction Identifiers (H-RNTI). Moreover, the processing unit may be configured to process a control channel data structure, which comprises a first and a second part and that coding in the first part depends on transmission to a single user device or multiple user devices.

BRIEF DESCRIPTION OF THE DRAWINGS

The present invention will be described in further detail with reference to the attached drawings illustrating exemplary embodiments, in which.

DETAILED DESCRIPTION

Figure 1:
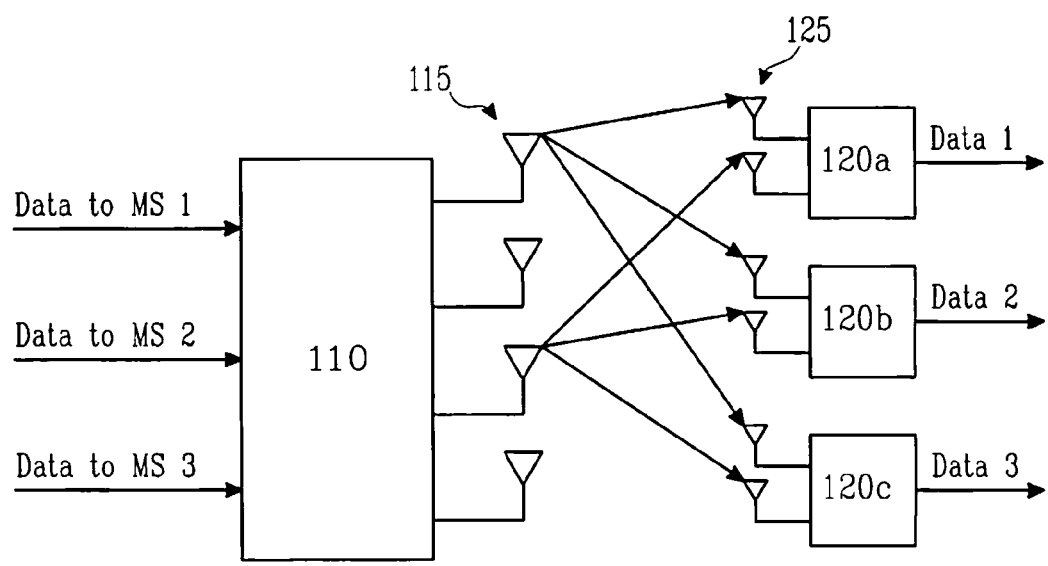
FIG. 1 is a schematic block diagram of a MU MIMO.

In the following, the invention is described with reference to HSPA context, however it may be equally applicable to LTE. It has to be noted that the control channel structure is different, but the principle described here can easily be adapted to any control channel structure. References are also made to FIG. 1, illustrating a general MU MIMO structure.

The invention is basically based on the fact that the control channel is scrambled or coded with a sequence that is unique for each terminal. If each user is allocated at least two sequences, one can be used when the data stream sent to this user is the only one, i.e. SU-MIMO operation, while the other sequence is used to scramble the control data when another stream is simultaneously scheduled for another user.

Figure 2:
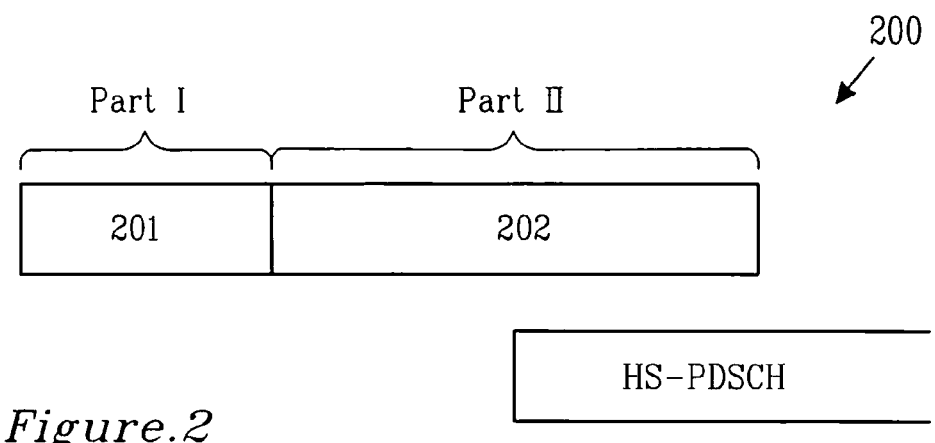
FIG. 2 illustrates schematically the structure of the HS-SCCH.

FIG. 2 shows schematically the structure of a Down Link (DL) control channel, HS-SCCH, used in High-Speed Downlink Packet Access (HSDPA). Note that the details of the control channel may differ slightly between UEs operating in MIMO mode and those not operating in MIMO mode.

The first part 201 of the control channel carries information relating to the actual code set used, the modulation order on each stream, the number of streams that are scheduled and also the pre-coding weight used.

Data in the second part 202 contain information about Transport Block Size (TBS), Hybrid Automatic Repeat Request (HARQ) related parameters and a UE specific cyclic redundancy check (CRC).

Figure 3:
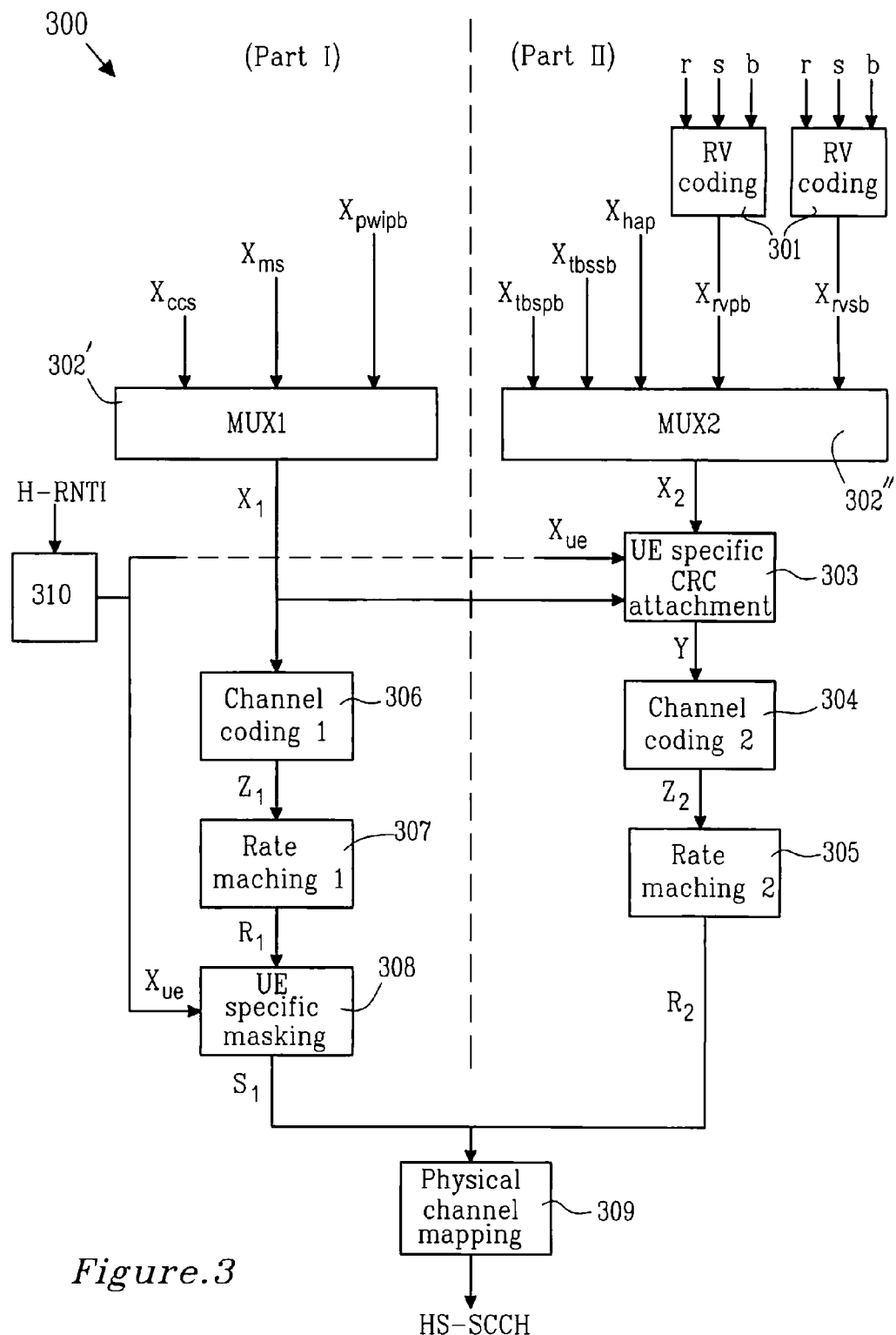
FIG. 3 illustrates a block diagram of an HS-SCCH coding chain according to the present invention.

FIG. 3 is a block diagram of an HS-SCCH generator 300 according to the present invention used in MIMO operation, e.g. in a base station 110 of FIG. 1. The figure shows that the first part (part I) of the control channel information is masked with the UE identity. Also that a UE specific CRC is added to the TBS and HARQ related bits in part II.

The UE specific masking and the UE specific CRC may both be derived from the same HS-DSCH Radio Network Identifier (H-RNTI).

Referring to FIG. 3, the following information is transmitted by means of the HS-SCCH physical channel:

Channelization-code-set information: $X_{ccs}$,
Modulation scheme and number of transport blocks information: $X_{ms}$,
Precoding weight information: $X_{pwipb}$,
Transport-block size information: $X_{tbspb}$,
Transport-block size information for the secondary transport block: $X_{tbssb}$,
Hybrid-ARQ process information: $X_{hap}$,
Redundancy and constellation version: $X_{rvpb}$,
Redundancy and constellation version for the secondary transport block: $X_{rvsb}$, and
UE identity: $X_{ue}$.

Describing from top to bottom, the coding chain arrangement 300 according to FIG. 3 starts with Redundancy and Constellation Version coding (RV codings 301) in part II using the redundancy version (RV) parameters r, s and constellation version parameter b, which are coded jointly to produce the values $X_{rvpb}$ and $X_{rvsb}$, respectively.

Channelization-code-set information, Modulation scheme and number of transport blocks information and Precoding weight information are multiplexed in MUX1 302' resulting in $X_1$.

The results from the RV codings and the Transport-block size information, Transport-block size information for the secondary transport block, and HARQ process information are multiplexed ($X_2$) in multiplexer MUX2, 302" and provided to UE specific CRC Attachment 303 together with UE identity and $X_1$. The resulting signal Y from UE specific CRC Attachment is coded in Channel Coding block 2 304 and provided to Rate Matching block 2 305 resulting in signal $R_2$.

In the first part, $X_1$ is provided to Cannel Coding block 1 306, the result of which is provided to the Rate Matching block 1 307 resulting in $R_1$. $R_1$ is provided to UE Specific Masking block 308 together with UE identity. The results from Rate Matching block 2 and the UE Specific Masking block are provided to a block for physical channel mapping 309 resulting in HS-SCCH.

According to the present invention, each UE is associated with at least two unique identifiers, and in a preferred embodiment with HS-DSCH Radio Network Transaction Identifiers (H-RNTIs), or alternatively, that different UE masking sequences are derived from one H-RNTI. This is done in block 310 of FIG. 3. If a single MIMO user is scheduled one stream, one specific masking is used, while if the other stream is scheduled to another user, the second UE masking is applied. In this way, the UE can identify if it should handle code-reuse interference or not.

In a preferred embodiment at least the masking in the first part of the HS-SCCH is different for SU- and MU-MIMO, while the CRC masking in part II can be either unchanged or follow the same rule. By using the masking in part I, the receiver will have some time to calculate the correct receiver weights before the actual HS-PDSCH transmission starts.

In another embodiment, e.g. if applied to another control channel structure, the complete control channel can be masked with different UE identities corresponding to one, two or more simultaneously scheduled users.

In the receiver site, i.e. UE, the receiver checks if it should handle code-reuse interference or not. Preferably, this is done by using the masking in the first part, whereby the UE calculates the correct receiver weights, possibly including the effect of code reuse interference. Based on the information extracted from the masking sequences as described earlier in relation to possible inter-stream interferences, the UE will detect whether a single receiver or other receivers share the same physical channel.

Figure 4:
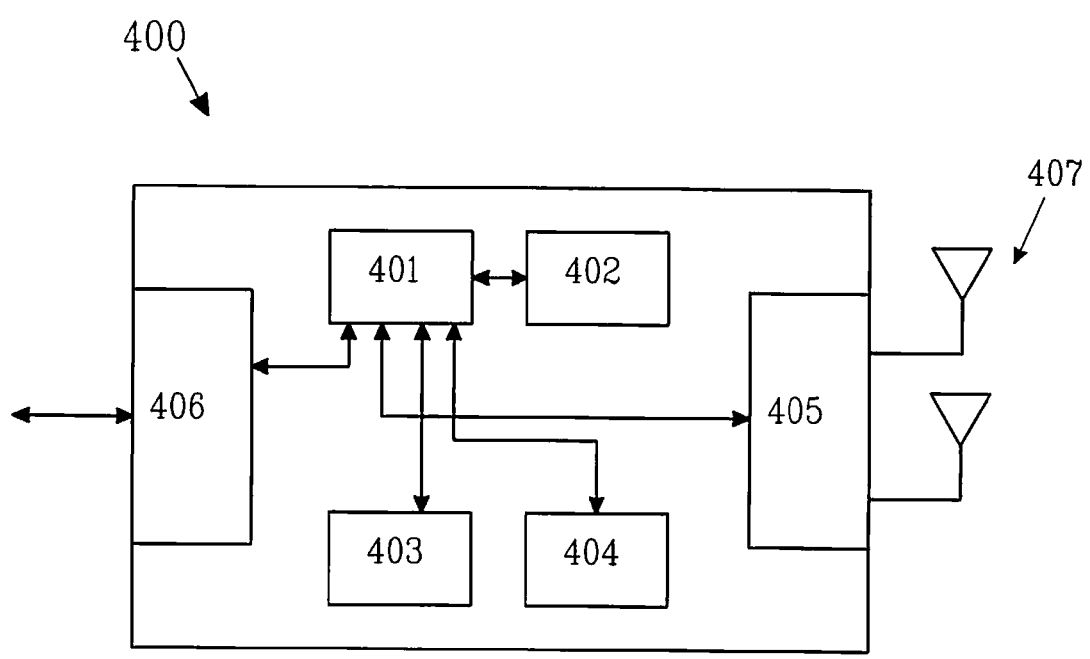
FIG. 4 is a block diagram of a user equipment according to the present invention.

A schematic block diagram of UE is illustrated in FIG. 4. The user equipment 400 comprises a processing unit 401 (e.g. a processor) that is arranged to run instruction sets for operating the communication part of the equipment. The processor 401 in turn may use at least one memory unit 402, 403 of volatile or non-volatile solution (e.g. RAM or flash memory). A user interface unit 404 may interact with a user of the equipment using any suitable type of user interface equipment (e.g. a keyboard, a keypad and/or other types of buttons or even a voice controlled solution). The user equipment 400 may be arranged with a communication interface 405 for communicating with a communications network using antennas 407 and it may further be arranged with a separate communication interface 406 for communicating with external or internal units or devices; for instance if the user equipment 400 is part of a laptop the separate communication interface may be connected to internal laptop processing and communication parts for mediating information between the communications network and any application in the laptop.

The instruction set(s) may be inserted into the equipment at production time, downloaded using the wireless communication link to the telecommunication network, or downloaded using another link to a communications network, such as for instance but not limited to a synchronization link between the mobile phone and a PC (not shown), a TCP/IP link between a laptop and a communication network (e.g. the Internet), and a wireless link (e.g. using at least one of Bluetooth, 802.11, 802.15, or 802.16 series of wireless communication protocols) between a PDA and a PC in turn connected for instance to the Internet.

In the receiver site, i.e. UE, the UE checks if it should handle code-reuse interference or not. Preferably, this is done by using the masking in the first part, whereby the UE calculates the correct receiver weights, possibly including the effect of code reuse interference. Based on the masking, the UE knows whether it is a single receiver or whether other receivers share the same data channel.

The UE 400 receives the information on the control channel from the network by means of the communication interface 405. The information is handled, e.g. by means of the processor 401 which also may be used to check if it should handle code-reuse interference or not by using the masking in the HS-SCCHs first part. The processor may further calculate the correct receiver weights and decide how to handle the control data as mentioned earlier.

It should be noted those terms specific for special network standards are given as examples in the embodiments and similar wordings for entities and items having the same functionality are not excluded from the invention.

The invention claimed is:

1. A method in a communications system enabled for transmission of several data streams to or from different receivers using a shared physical channel, wherein the method comprises:
    masking a shared control channel with different sequences corresponding to a receiver identity with respect to the number of simultaneously scheduled receivers,
    coding control data of said control channel with a sequence uniquely identifying each receiver,
    allocating at least two sequences such that a first sequence can be used when said data stream is sent to a single receiver and a second sequence is used to code said control data when another stream is scheduled for a second receiver, and
    deriving different receiver masking sequences from one HS-DSCH Radio Network Transaction Identifier (H-RNTI).

2. The method of claim 1, further comprising:
    associating each receiver with at least two HS-DSCH Radio Network Transaction Identifiers (H-RNTIs).

3. The method of claim 1, further comprising:
    modifying a control channel data structure, which comprises a first and a second part and that coding in said first part depends on transmission to a single receiver or multiple receivers.

4. The method of claim 3, further comprising:
    modifying said second part, comprising a cyclic redundancy check (CRC) masking depending on transmission to a single receiver or multiple receivers.

5. A non-transitory computer-readable medium in an infrastructure node of a communications network enabled for transmission of several data streams to or from different receivers using shared physical channels, said non-transitory computer-readable medium comprising:
    a logic block for Redundancy and Constellation Version coding (RV coding) in communication with a logic block for receiver specific cyclic redundancy check (CRC) attachment, which communicates with a logic block for a second channel coding, the output of which is input to a second rate matching logical block connected to a channel mapping arrangement connected to a receiver specific masking logic in communication with a first rate matching logical block connected to first channel coding block; and
    a logical unit configured to associate a user equipment, UE, with at least two HS-DSCH Radio Network Transaction Identifiers (H-RNTIs) based on the number of parallel transmission streams, wherein different UE masking sequences are derived from one H-RNTI.

6. The arrangement of claim 5, further comprising:
    means for detecting if a single MIMO user is scheduled one stream, and means to generate one specific masking, and if a second stream is scheduled to another UE, means to apply a second UE masking.

7. A base station in a MIMO operated network, comprising an arrangement according to claim 5.

8. A user device comprising:
    a processing unit configured to execute instruction sets for operating said user device;

a memory unit;

a user interface unit; and a communication interface for communicating with a communication network, wherein said processing unit is configured to detect internal handling of code-reuse interference in a data stream received by said communication interface, whereby said processor is further configured to analyse a masking in a part of said stream, and calculate a correct user device weight and decide how to handle control data, and wherein said masking is for masking a shared control channel with different sequences corresponding to a receiver identity with respect to the number of simultaneously scheduled receivers, wherein said stream comprises a masked control channel, masked with different sequences corresponding to an identity of the user device corresponding to the number of simultaneously scheduled user devices, and wherein said masking is derived from different user device masking sequences from one HS-DSCH Radio Network Transaction Identifier (H-RNTI).

9. The user device of claim 8, wherein said identity is an HS-DSCH Radio Network Transaction Identifier (H-RNTIs).

10. The user device of claim 8, wherein said processing unit is configured to process a control channel data structure, which comprises a first and a second part and that coding in said first part depends on transmission to a single user device or multiple user devices.

* * * * *